US010985874B2

(12) United States Patent
Latif et al.

(10) Patent No.: US 10,985,874 B2
(45) Date of Patent: Apr. 20, 2021

(54) HARQ FRAMING AND RETRANSMISSION WITH TWO-TIER FEEDBACK

(71) Applicant: SEMICONDUCTOR COMPONENTS INDUSTRIES, LLC, Phoenix, AZ (US)

(72) Inventors: Imran Latif, Fremont, CA (US); Sigurd Schelstraete, Menlo Park, CA (US); Hossein Dehghan, Diablo, CA (US); Huizhao Wang, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 32 days.

(21) Appl. No.: 16/676,141

(22) Filed: Nov. 6, 2019

(65) Prior Publication Data

US 2020/0153547 A1    May 14, 2020

Related U.S. Application Data

(60) Provisional application No. 62/758,677, filed on Nov. 11, 2018, provisional application No. 62/817,993, (Continued)

(51) Int. Cl.
*H04L 1/00* (2006.01)
*H04L 1/18* (2006.01)
*H04W 72/04* (2009.01)

(52) U.S. Cl.
CPC .......... *H04L 1/0061* (2013.01); *H04L 1/0045* (2013.01); *H04L 1/1812* (2013.01); *H04L 1/1864* (2013.01); *H04W 72/0466* (2013.01)

(58) Field of Classification Search
CPC ... H04L 1/0045; H04L 1/0061; H04L 1/1812; H04L 1/1816; H04L 1/1864;
(Continued)

(56) References Cited

U.S. PATENT DOCUMENTS

2014/0092824 A1    4/2014 He et al.
2017/0230149 A1    8/2017 Wang et al.
(Continued)

OTHER PUBLICATIONS

European Search Report for counterpart EP Application No. 19207943, dated Mar. 10, 2020, 3 pages.
(Continued)

*Primary Examiner* — Mewale A Ambaye
(74) *Attorney, Agent, or Firm* — Maschoff Brennan

(57) ABSTRACT

An example method may include receiving a wireless packet from a sender node at a receiver node that includes a PHY and a MAC. The wireless packet may include multiple codewords. The method may include error checking the codewords at the PHY of the receiver node for codeword-level errors. The method may include generating multiple MPDUs from the codewords. The method may include error checking the MPDUs at the MAC of the receiver node for MPDU-level errors. The method may include generating two-tier feedback based on the error checking at the PHY and the MAC of the receiver node. The method may include sending the two-tier feedback to the sender node.

24 Claims, 9 Drawing Sheets

Related U.S. Application Data filed on Mar. 13, 2019, provisional application No. 62/874,406, filed on Jul. 15, 2019.

(58) Field of Classification Search
CPC .......... H04L 1/1893; H04L 1/00; H04L 1/18; H04W 72/0466; H04W 72/04
See application file for complete search history.

(56) References Cited

U.S. PATENT DOCUMENTS

| | | | |
|---|---|---|---|
| 2018/0020396 A1* | 1/2018 | Yoshimura | H04W 84/12 |
| 2018/0054803 A1* | 2/2018 | Yoshimura | H04L 5/0007 |
| 2018/0092039 A1* | 3/2018 | Cariou | H04W 52/16 |
| 2020/0145139 A1* | 5/2020 | Merlin | H04W 4/80 |

OTHER PUBLICATIONS

Sequans: "CBG A/N multiplexing for CA and cross-slot scheduling". 3GPP Draft; RI-1718708—CBG Based HARQ, 3rd Generation Partnership Project (3GPP), Mobile Competence Centre; 650, Route Des Lucioles; F-06921 Sophia-Antipolis Cedex; France, vol. RAN WGI, No. Prague, CZ; Oct. 9, 2017-Oct. 13, 2017 Oct. 8, 2017, XP051341881, Retrieved from the Internet: URL:http://www.3gpp.org/ftp/Meetings-3GPP-SYNC/RAN1/Docs/ [retrieved on Oct. 8, 2017], pp. 1-3.

Interdigital Inc: "On the remaining details of CBG based (re)transmission", 3GPP Draft; RI-1720555 (R15 NR WI AI 7333 CBG Based Retransmission), 3rd Generation Partnership Project {3GPP), Mobile Competence Centre; 650, Route Des Lucioles; F-06921 Sophia-Antipolis Cedex; France, vol. RAN WGI, No. Reno, USA; Nov. 2017, XP051369249, Retrieved from the Internet: URL:http://www.3gpp.org/ftp/tsg%5Fran/WG1% 5FRL1/TSGR1%5F91/Docs/ [retrieved on Nov. 17, 2017], p. 2.

Huawei et al: Summary of remaining issues on CBG-based (re)transmission11 , 3GPP Draft; RI-1800075, 3rd Generation Partnership Project (3GPP), Mobile Competence Centre ; 650, Route Des Lucioles ; F-06921 Sophia-Antipolis Cedex ; France, vol. RAN WGI, No. Vancouver, Canada; Jan. 22, 2018-Jan. 26, 2018 Jan. 13, 2018, XP051384578, Retrieved from the Internet: URL:http://www.3gpp.org/ftp/tsg%5Fran/WG1% 5FRL1/TSGR1%5FAH/NR%5FAH%5F1801/Docs/ [retrieved on Jan. 13, 2018], pp. 1-2.

\* cited by examiner

HARQ FRAMING AND RETRANSMISSION WITH TWO-TIER FEEDBACK

CROSS-REFERENCE TO RELATED APPLICATIONS

This patent application claims the benefit of prior filed U.S. Provisional Application No. 62/758,677 filed on Nov. 11, 2018; prior filed U.S. Provisional Application No. 62/817,993 filed on Mar. 13, 2019; and prior filed U.S. Provisional Application No. 62/874,406 filed on Jul. 15, 2019. The 62/758,677 application, the 62/817,993 application, and the 62/874,406 application is each incorporated herein by reference.

FIELD

The implementations discussed herein are related to hybrid automatic repeat request (HARQ) framing and retransmission.

BACKGROUND

Unless otherwise indicated herein, the materials described herein are not prior art to the claims in the present application and are not admitted to be prior art by inclusion in this section.

Home, office, stadium, and outdoor networks, a.k.a. wireless local area networks (WLAN) are established using a device called a Wireless Access Point (WAP). The WAP may include a router. The WAP wirelessly couples all the devices of the local network, e.g. wireless stations such as: computers, printers, televisions, digital video (DVD) players, security cameras and smoke detectors to one another and to the Cable or Subscriber Line through which Internet, video, and television is delivered to the local network. Most WAPs implement the IEEE 802.11 standard which is a contention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

In digital communication, transmission of information produces errors. Techniques of reducing and monitoring error, such as hamming codes, introduce redundancy in data by adding information to existing data to identify and correct errors following transmission of the data. For example, appending an error correction code to a unit of data and transmitting the resulting codeword can allow for higher tolerance to noise and error.

Typically, a transmitter encodes a data unit to produce a "codeword". Before sending, data is encoded into a codeword from a limited number of possible codewords including error correction data. The transmitter then sends the codeword to a receiver. Once a codeword has been properly received, an algorithm, such as the Viterbi algorithm or the Bahl, Cocke, Jelinek, Raviv (BCJR) algorithm, can be used to decode the codeword.

Every frame transmitted by an 802.11 device requires a significant amount of overhead, including radio level headers, Media Access Control (MAC) frame fields, interframe spacing, and acknowledgment of transmitted frames, etc. Overhead can consume more bandwidth at high data rates than the payload data frame. To address this issue, the 802.11n standard introduced types of frame aggregation that group several data frames into one large frame: Media Access Control (MAC) Service Data Unit (MSDU) aggregation and MAC Protocol Data Unit (MPDU) aggregation. An MPDU is a message that is exchanged between MAC entities.

HARQ is a well-studied and widely used mechanism in wireless, especially cellular communications, to improve link quality. HARQ is a combination of high-rate forward error-correcting coding and ARQ like error-control. In standard ARQ, redundant bits are added to data to be transmitted using an error-detecting (ED) code such as a cyclic redundancy check (CRC). HARQ traditionally performs better than ordinary ARQ in poor signal conditions, but in its simplest form this comes at the expense of significantly lower throughput in good signal conditions. There is typically a signal quality cross-over point below which simple HARQ is better, and above which basic ARQ is better.

Wi-Fi fails to include HARQ in any of its releases until and including IEEE 802.11ax. Conventional HARQ approaches have been unsuitable with Wi-fi due to high complexity in terms of transceiver design and inefficiency of MAC level protocol to support the re-transmissions.

The subject matter described herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a method may include receiving a wireless packet from a sender node at a receiver node that includes a physical layer (PHY) and a media access control layer (MAC). The wireless packet may include multiple codewords. The method may include error checking the codewords at the PHY of the receiver node for codeword-level errors. The method may include generating multiple MAC protocol data units (MPDUs) from the codewords. The method may include error checking the MPDUs at the MAC of the receiver node for MPDU-level errors. The method may include generating two-tier feedback based on the error checking at the PHY and the MAC of the receiver node. The method may include sending the two-tier feedback to the sender node.

In another example embodiment, a receiver node for wireless communication with a sender node in a wireless network may include one or more antennas, multiple components coupled to one another to form receive chains and transmit chains coupled to the one or more antennas, and a processor. The processor may be coupled to the components and to the one or more antennas to perform or control performance of operations that may include receiving a wireless packet from the sender node at the receiver node that includes PHY and a MAC. The wireless packet includes multiple codewords. The operations may include error checking the codewords at the PHY of the receiver node for codeword-level errors. The operations may include generating multiple MPDUs from the codewords. The operations may include error checking the MPDUs at the MAC of the receiver node for MPDU-level errors. The operations may include generating two-tier feedback based on the error checking at the PHY and the MAC of the receiver node. The operations may include sending the two-tier feedback to the sender node.

In another example embodiment, a method may include sending a wireless packet to a receiver node that includes a PHY and a MAC. The wireless packet may include multiple codewords that represent an A-MPDU including multiple MPDUs. The method may include receiving two-tier feedback from the receiver node, including receiving a negative acknowledgment (NACK) that indicates a failed codeword. The method may include constructing a retransmission packet that includes a retransmission codeword that corresponds to the failed codeword. The method may include sending the retransmission packet to the receiver node.

In another example embodiment, a sender node for wireless communication with a receiver node in a wireless network may include one or more antennas, multiple components coupled to one another to form receive chains and transmit chains coupled to the one or more antennas, and a processor. The processor may be coupled to the components and to the one or more antennas to perform or control performance of operations that may include sending a wireless packet to a receiver node that includes a PHY and a MAC. The wireless packet may include multiple codewords that represent an A-MPDU including multiple MPDUs. The operations may include receiving two-tier feedback from the receiver node, including receiving a NACK that indicates a failed codeword. The operations may include constructing a retransmission packet that includes a retransmission codeword that corresponds to the failed codeword. The operations may include sending the retransmission packet to the receiver node.

The invention may be implemented in hardware, firmware, or software.

Associated devices and circuits are also claimed.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific implementations thereof which are illustrated in the appended drawings. It is appreciated that these drawings depict only typical implementations of the invention and are therefore not to be considered limiting of its scope. The invention will be described and explained with additional specificity and detail using the accompanying drawings in which.

DETAILED DESCRIPTION OF SOME EXAMPLE IMPLEMENTATIONS

Implementations described herein may generally include HARQ framing and retransmission at a codeword level, e.g., on the PHY of a sender node and a receiver node. The sender node aggregates MPDUs at a MAC of the sender node as an A-MPDU and the PHY generates corresponding codewords that are transmitted to the receiver node. The receiver node receives the codewords and generates corresponding MPDUs and error checks at both the codeword level and the MPDU level. The receiver node may then send codeword level feedback and/or MPDU level feedback to the sender node. When the feedback includes codeword level feedback indicating one or more failed codewords, the sender node constructs a retransmission packet that includes one or more corresponding retransmission codewords. The sender node may send the receiver node the retransmission codewords alone or combined with new codewords in the retransmission packet. The receiver node receives the retransmission packet with the retransmission codewords and soft combines them with the failed codewords if correctly received or sends new two-tier feedback identifying one or more failed codewords. The receiver node may also receive the new codewords and process them in the same manner as the original codewords (e.g., two-tier error checking, two-tier feedback, etc.).

Some implementations described herein may be spectrally efficient and may combine retransmission codewords with new codewords. Some implementations may be independent to HARQ scheme and may support both chase combining (CC) HARQ and incremental redundancy (IR) HARQ. Some implementations introduce a new PHY preamble field that can also support MU operations (OFDMA and/or MU MIMO).

Reference will now be made to the drawings to describe various aspects of example implementations of the invention. It is to be understood that the drawings are diagrammatic and schematic representations of such example implementations, and are not limiting of the present invention, nor are they necessarily drawn to scale.

Figure 1:
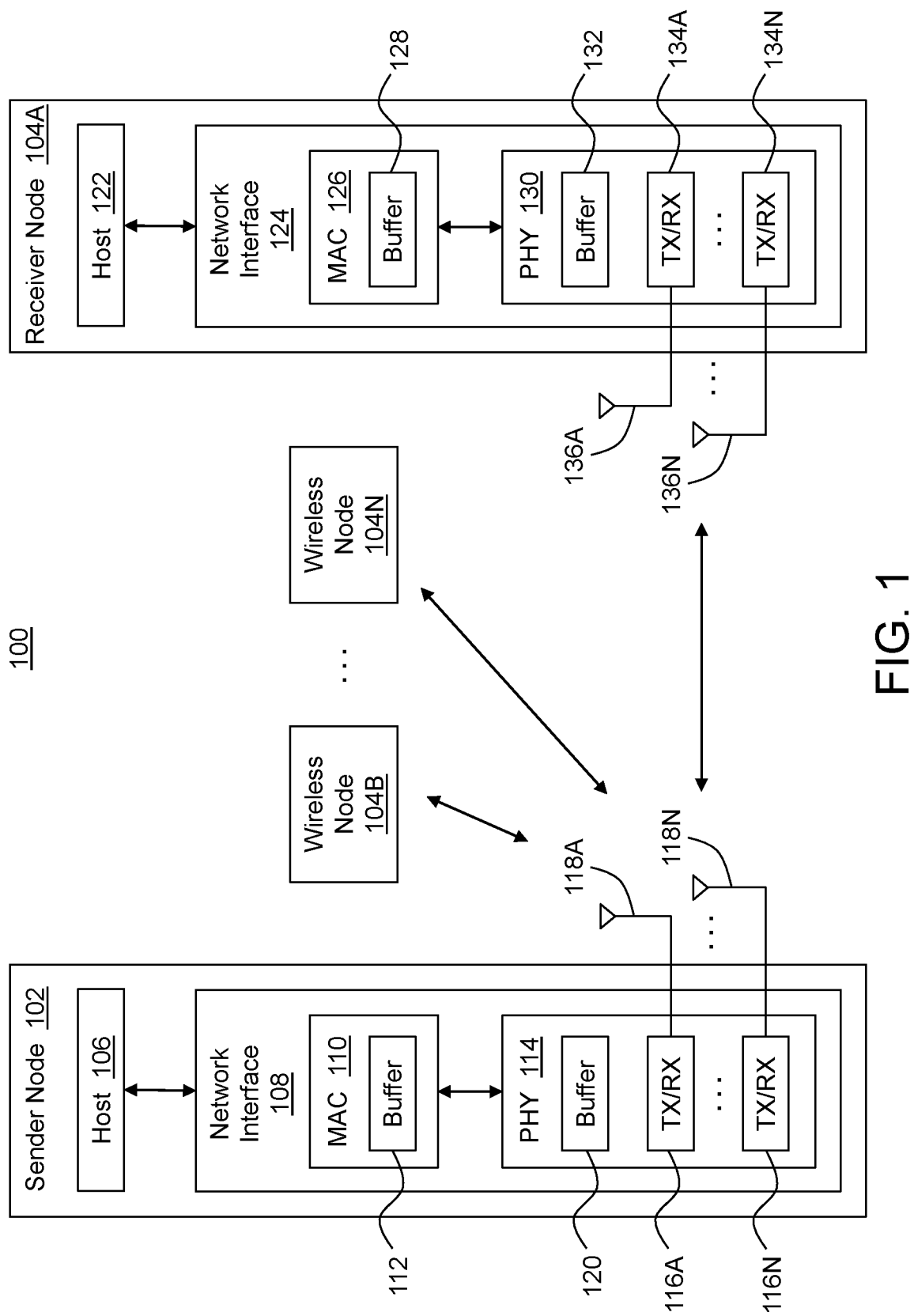
FIG. 1 is a block diagram of an example wireless local area network (WLAN) for HARQ framing and retransmission.

FIG. 1 is a block diagram of an example wireless local area network (WLAN) 100 for HARQ framing and retransmission, arranged in accordance with at least one implementation described herein. The WLAN 100 includes multiple wireless nodes 102, 104A-104N (collectively wireless nodes 104). As illustrated, the wireless node 102 is implemented as an access point (AP) and each of the wireless nodes 104 is implemented as a wireless client device or station (STA). for Example, the wireless node 102 may include a gateway, a repeater, a mesh node, and/or other suitable access point for wireless stations or devices such as the wireless nodes 104. The wireless node 102 may connect to the Internet and/or a core network via a bridge, a backhaul link, a base station, and/or other suitable devices or connections. Each of the wireless nodes 104 may generally include any device that has the capability to wirelessly connect to the wireless node 102 according to any of the IEEE 802.11 standards or other suitable wireless standard. Each of the wireless nodes 104 may include a desktop computer, a laptop computer, a tablet computer, a mobile phone, a smartphone, a personal digital assistant (PDA), a smart television, or any other suitable wireless station.

In general, the wireless nodes 102, 104 may be configured to communicate wirelessly with each other, including sending and receiving data packets. Each of the wireless nodes 102, 104 may be considered a sender node when sending data or a receiver node when receiving data. In various examples described herein, the wireless node 102 may transmit and retransmit data to the wireless node 104A. In these examples, the wireless node 102 may be referred to as a sender node 102 while the wireless node 104A may be referred to as a receiver node 104A.

As illustrated in FIG. 1, the sender node 102 includes a host processor 106 coupled to a network interface 108. The network interface 108 includes a medium access control (MAC) layer that includes a MAC processor 110 with or coupled to a MAC buffer 112 (e.g., a MAC-level transmit (TX) and/or receive (RX) buffer), and a physical layer (PHY) that includes a PHY processor unit 114. The PHY processor unit 114 includes one or more transceivers 116A-116N (collectively transceivers 116), and the transceivers 116 are coupled to one or more antennas 118A-118N (collectively antennas 118). The PHY processor unit 114 includes or is coupled to a PHY buffer 120 (e.g., a PHY-level TX and/or RX buffer). Although two transceivers 116 and two antennas 118 are illustrated in FIG. 1, the sender node 102 can include different numbers (e.g., 1, 2, 4, 5, etc.) of transceivers 116 and antennas 118 in other implementations.

The WLAN 100 includes multiple wireless nodes 104. Although three wireless nodes 104 are illustrated in FIG. 1, the WLAN 100 can include different numbers (e.g., 1, 2, 3, 4, 5, 6, etc.) of wireless nodes 104 in other implementations.

In an example, the sender node 102 is configured to transmit packets that support a HARQ procedure for reception by the wireless nodes 104. In another example, one or more of the wireless nodes 104 may be configured to transmit packets that support the HARQ procedure for reception by the sender node 102.

As illustrated, the receiver node 104 includes a host processor 122 coupled to a network interface 124. Similar to the network interface 108, the network interface 124 may include both a MAC and a PHY. In particular, the network interface 124 includes a MAC processor unit 126 with or coupled to a MAC buffer 128 and a PHY processor unit 130 with or coupled to a PHY buffer 132. The PHY processor unit 130 includes one or more transceivers 134A-134N (collectively transceivers 134A), and the transceivers 134 are coupled to one or more antennas 136A-136N (collectively antennas 136). Although two transceivers 134 and two antennas 136 are illustrated in FIG. 1, the receiver node 104A can include different numbers (e.g., 1, 2, 4, 5, etc.) of transceivers 134 and antennas 136 in other implementations.

In an example, one or more of the wireless nodes 104B-104N has a structure the same as or similar to the receiver node 104A.

In an implementation, the sender node 102 prepares data for transmission as MAC protocol data units (MPDUs) in an aggregate MPDU (A-MPDU) at the MAC (e.g., at the MAC processor unit 110) which A-MPDU is changed to codewords at the PHY (e.g., at the PHY processor unit 114) and transmitted in a wireless packet to the receiver node 104A. The MPDUs may be buffered in the MAC buffer 112, e.g., for MPDU-level retransmissions. The codewords may be buffered in the PHY buffer 120, e.g., for codeword-level retransmissions.

The receiver node 104A receives the wireless packet and processes it at the PHY of the receiver node 104A (e.g., the PHY processor unit 130). In particular, the PHY processor unit 130 receives the wireless packet, e.g., a bitstream, and parses the bitstream into codewords. The PHY processor unit 130 may error check the codewords for codeword-level errors and may identify one or more codeword-level errors. The PHY processor unit 130 may buffer one or more codewords in the PHY buffer 132, e.g., to be combined subsequently with retransmitted codewords in the HARQ procedure according to a log likelihood ratio (LLR) combination or other suitable process. MPDUs making up an A-MPDU are generated from the codewords, e.g., by one or both of the PHY processor unit 130 and the MAC processor unit 126. The MAC processor unit 126 may error check the MPDUs for MPDU-level errors and may identify one or more MPDU-level errors (e.g., undecodable or incorrectly decoded MPDUs) and/or one or more received MPDUs (e.g., successfully decoded MPDUs). The MAC processor unit 136 may buffer one or more MPDUs in the MAC buffer 128.

The receiver node 104A may then generate two-tier feedback based on the error checking at the PHY and the MAC of the receiver node 104A and may send the two-tier feedback to the sender node 102. The two-tier feedback may identify one or more codeword-level errors. For example, the two-tier feedback may include a negative acknowledgement (NACK) that indicates and/or identifies one or more failed codewords and/or one or more received codewords. In some examples, the generated two-tier feedback may also identify one or more failed MPDUs and/or one or more received MPDUs.

The sender node 102 receives the two-tier feedback from the receiver node 104A. For example, the sender node 102 may receive the NACK that indicates the failed codewords. The sender node 102, and in particular the PHY of the sender node 102, constructs a retransmission packet that includes retransmission codewords that correspond to the failed codewords. For example, the PHY of the sender node 102 may retrieve codewords indicated as the failed codewords in the NACK from the PHY buffer 120 and may include the retrieved codewords in the retransmission packet as the retransmission codewords.

In some implementations, the two-tier feedback received from the receiver node 104A initiates a dedicated HARQ session between the sender node 102 and the receiver node 104A. During the dedicated HARQ session, the sender node 102 packs only the retransmission codewords in a dedicated retransmission packet which is sent to the receiver node 104A. The PHY of the receiver node 104A receives the retransmission codewords and if they are successfully received (e.g., by themselves or when LLR combined with the failed codewords), combines them with the previously received codewords and forwards the decoded bitstream to the MAC of the receiver node 104A. The MAC of the receiver node 104A performs MAC-level error checking again and terminates the dedicated HARQ session if all MPDUs of the A-MPDU are received, e.g., by sending to the sender node 102 a conventional MPDU block acknowledgment (BA). If one or more of the retransmission codewords fails again, another round of two-tier feedback (e.g., another NACK identifying the specific failed retransmission codewords) is sent to the sender node 102. The process of sending two-tier feedback and receiving dedicated retransmission packets may repeat until all the codewords are successfully received and the MPDU BA or other MPDU-level feedback is sent to the sender node 102 or until the dedicated HARQ session times out.

In some implementations, rather than the two-tier feedback initiating a dedicated HARQ session in which only retransmission codewords are sent until the entire A-MPDU is received, the sender node 102 combines retransmission codewords with a new A-MPDU. This may be more efficient than creating a dedicated HARQ session.

Figure 2:
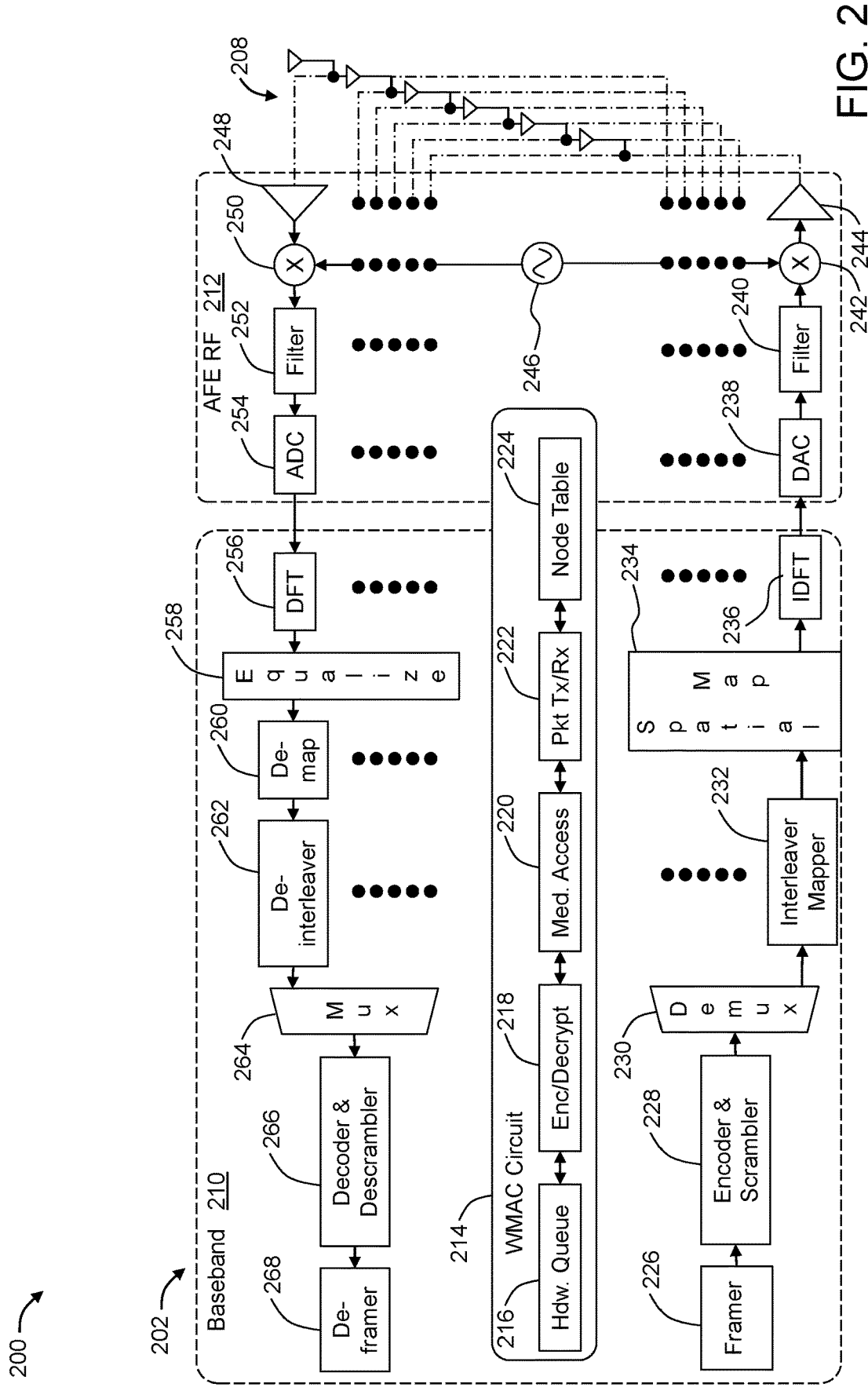
FIG. 2 is a block diagram of an example wireless node that may implement HARQ framing and retransmission.

FIG. 2 is a block diagram of an example wireless node 200 that may implement HARQ framing and retransmission, arranged in accordance with at least one embodiment described herein. The wireless node 200 may be operable as an AP or a station. Any of the sender node 102 or the wireless nodes 104 of FIG. 1 may be implemented as the wireless node 200. In general, the wireless node 200 may include a WiFi stage 202.

The WiFi stage 202 may generally include multiple shared and discrete components which make up various transmit and receive chains coupled to one or more antennas 208. The wireless node 200 is specifically illustrated as a 6×6 multiple-input multiple-output (MIMO) AP that supports as many as 6 discrete communication streams over six antennas 208. Alternatively, the wireless node 200 may include any number of antennas (e.g., 2×2, 4×4, 5×5, . . . , 16×16, etc). More generally, the wireless node 200 may include any suitable number of antennas 208 in any suitable arrangement such as MIMO, single-input single-output (SISO), single-input multiple-output (SIMO), or multiple-input single-output (MISO).

Although not illustrated in FIG. 2, the wireless node 200 may couple via an integral modem to one of a cable, a fiber, or a digital subscriber backbone connection to, e.g., the Internet. A packet bus (not illustrated in FIG. 2) may couple the modem to the WiFi stage 202. The WiFi stage 202 supports wireless communications, e.g. IEEE 802.11 compliant communications, on a WLAN, such as the WLAN 100 of FIG. 1. As illustrated in FIG. 2, the WiFi stage 202 includes a baseband circuit 210, an analog front end (AFE) and RF circuit 212, and the antennas 208.

In the baseband circuit 210, wireless communications transmitted to or received from each user/client/station are processed. The AFE and RF circuit 212 handles the upconversion on each transmit chain or path of wireless transmissions initiated in the baseband. The AFE and RF circuit 212 also handles the downconversion of signals received on the receive chains or paths and passes them for further processing to the baseband circuit 210.

Each transmit chain/path may include one or more of the following discrete and shared components. Data to be transmitted on the packet bus is initially processed by a WiFi medium access control (WMAC) circuit 214. The MAC processor units 110, 126 of FIG. 1 may include, be included in, or correspond to the WMAC 214. The WMAC circuit 214 includes hardware queues 216 for each downlink and uplink communication stream; an encryption and decryption circuit 218 to encrypt and decrypt the downlink and uplink communication streams; a medium access circuit 220 to make the clear channel assessment (CCA), and to make exponential random backoff and re-transmission decisions; and a packet processor circuit 222 for packet processing of the transmitted and received communication streams. The WMAC circuit 214 may have access to a node table 224 which lists each node/station on the WLAN, the station's capabilities, each corresponding encryption key, and/or a priority associated with its communication traffic. The WMAC circuit 214 outputs MPDUs to a framer 226.

Each sounding packet or data packet for wireless transmission on the transmit chain components to one or more stations is framed in the framer 226. Next each stream is encoded and scrambled in an encoder and scrambler 228 which outputs codewords. The codewords are demultiplexed in a demultiplexer 230 into separate streams. Next, streams are subject to interleaving and mapping in a corresponding one of multiple interleaver mappers 232. A single interleaver mapper 232 is illustrated in FIG. 2, with a series of five dots above the interleaver mapper 232 representing five replicate interleaver mappers 232 (e.g., for a total of six interleaver mappers 232 including one in each transmit chain in this example). Other components in FIG. 2 are similarly designated as having replicates by various series of dots.

Following interleaving and mapping, all transmissions are spatially mapped in a spatial mapper 234. The spatially mapped streams from the spatial mapper 234 are input to Inverse Discrete Fourier Transform (IDFT) circuits 236 for conversion from the frequency to the time domain and subsequent transmission in the AFE and RF circuit 212.

Each IDFT circuit 236 is coupled to a corresponding transmit chain/path in the AFE RF circuit 212. Specifically, each IDFT circuit 236 couples to a corresponding digital-to-analog converter (DAC) 238 to convert the digital transmission to analog, a corresponding filter 240, a corresponding upconverter 242, and a corresponding power amplifier 244. Each filter 240 may include a bandpass filter or other suitable filter. Each upconverter 242 is coupled to a common voltage-controlled oscillator (VCO) 246 to upconvert the transmission to an appropriate center frequency of a selected channel. Each power amplifier 244 may set a transmit power level of the transmission on the corresponding antenna 208.

Each receive chain/path in the AFE RF circuit 212 may include one or more of the following discrete and shared components. Received communications on the antennas 208 are subject to RF processing including downconversion in the AFE RF circuit 212. There are six receive paths in the illustrated implementation, each including one or more of the following discrete and shared components: a low noise amplifier (LNA) 248 to amplify the received signal under control of an AGC (not illustrated in FIG. 2) to set an amount by which the received signal is amplified, a downconverter 250 coupled to the VCO 246 to downconvert the received signal, a filter 252, e.g., to bandpass filter the received signal, and an analog-to-digital converter (ADC) 254 to digitize the downconverted signal. The digital output from each ADC 254 is passed to a corresponding discrete Fourier transform (DFT) circuit 256 in the baseband circuit 210 of the WiFi stage 200 to convert from the time to the frequency domain.

Receive processing in the baseband circuit 210 may include one or more of the following shared and discrete components. First, an equalizer 258 is coupled to the output of the DFT 256 to mitigate channel impairments. The received WiFi streams at the output of the equalizer 258 are subject to demapping and deinterleaving in a corresponding demapper 260 and deinterleaver 262. Next, the received streams are multiplexed in multiplexer 264 which outputs codewords. The baseband circuit 210 may include or be coupled to a PHY buffer, such as the PHY buffer 120 of FIG. 1, to buffer the codewords output by the multiplexer 264. The codewords are decoded and descrambled in a decoder and descrambler 266, followed by de-framing in a deframer 268. The received communication as a series of one or more MPDUs is then passed to the WMAC circuit 214 where it is decrypted with the encryption and decryption circuit 218 and placed in the appropriate upstream hardware queue 216 for upload to the Internet. The PHY processor units 114, 130 of FIG. 1 may include or correspond to the transmit chains including one or more of the components from the framer 226 to the power amplifiers 244 and/or one the receive chains including one or more of the components from the LNAs 248 to the deframer 268.

Each of the antennas 208 may include a single antenna with one or more sectors, or multiple antennas each with one or more sectors. One or more of the antennas 208 may be steerable and/or may be or include a directional antenna. In an example implementation, each of the antennas 208 is an electronically steerable antenna (ESA). Various types of antenna are suitable for this purpose, such as patch antennas, phased arrays, and Yagi antennas. The antennas 208 may each include a driven element and one or more parasitic elements.

Figure 3A:
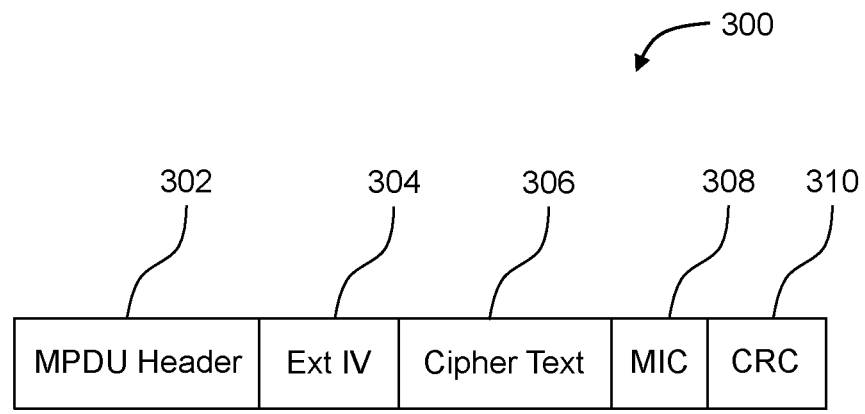
FIG. 3A illustrates an example MPDU.

FIG. 3A illustrates an example MPDU 300. MPDU 300 includes a MPDU header 302, an Ext IV bit 304, cipher text 306, a message integrity code (MIC) 308, and a CRC 310. If an MPDU is sent to a receiver node and subsequently retransmitted to the receiver node, the retransmitted MPDU usually has changes compared to the original MPDU due to a flipped retry bit in the MPDU header 302, different cipher text 306, and a different CRC 310.

Figure 3B:
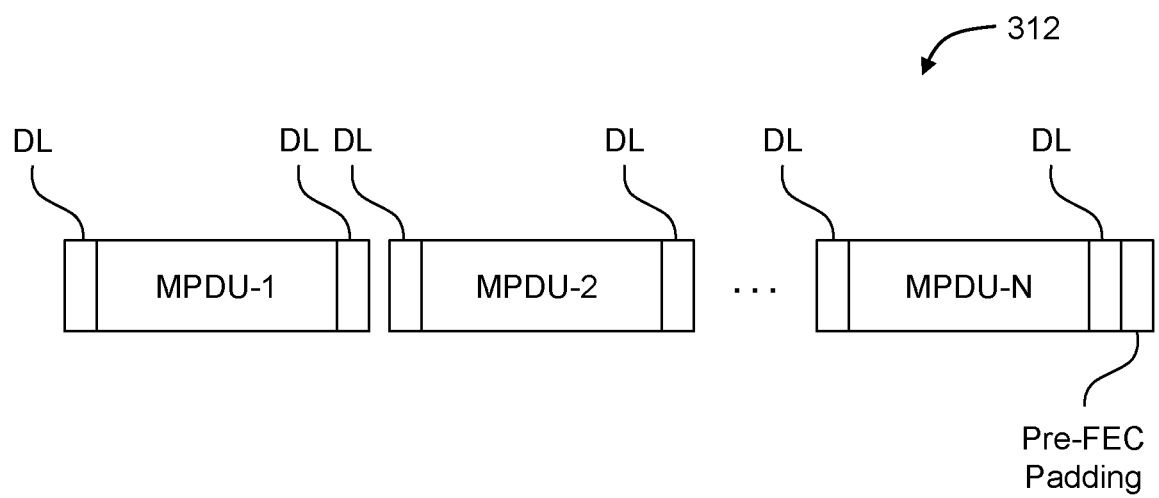
FIG. 3B illustrates an example A-MPDU made up of multiple MPDUs.

FIG. 3B illustrates an example A-MPDU 312 made up of multiple MPDUs including MPDU-1 to MPDU-N. As illustrated, the A-MPDU includes a delimiter (DL) at the beginning and end of each MPDU and pre-forward error correction (FEC) padding at the end of the last MPDU, e.g., at the end of MPDU-N. If an A-MPDU is sent to a receiver node and subsequently retransmitted to the receiver node, the retransmitted A-MPDU usually has changes compared to the original A-MPDU due to an arbitrary number of DLs among the MPDUs, a flipped retry bit in each MPDU's header, different cipher text, and different CRC bits.

Figure 4:
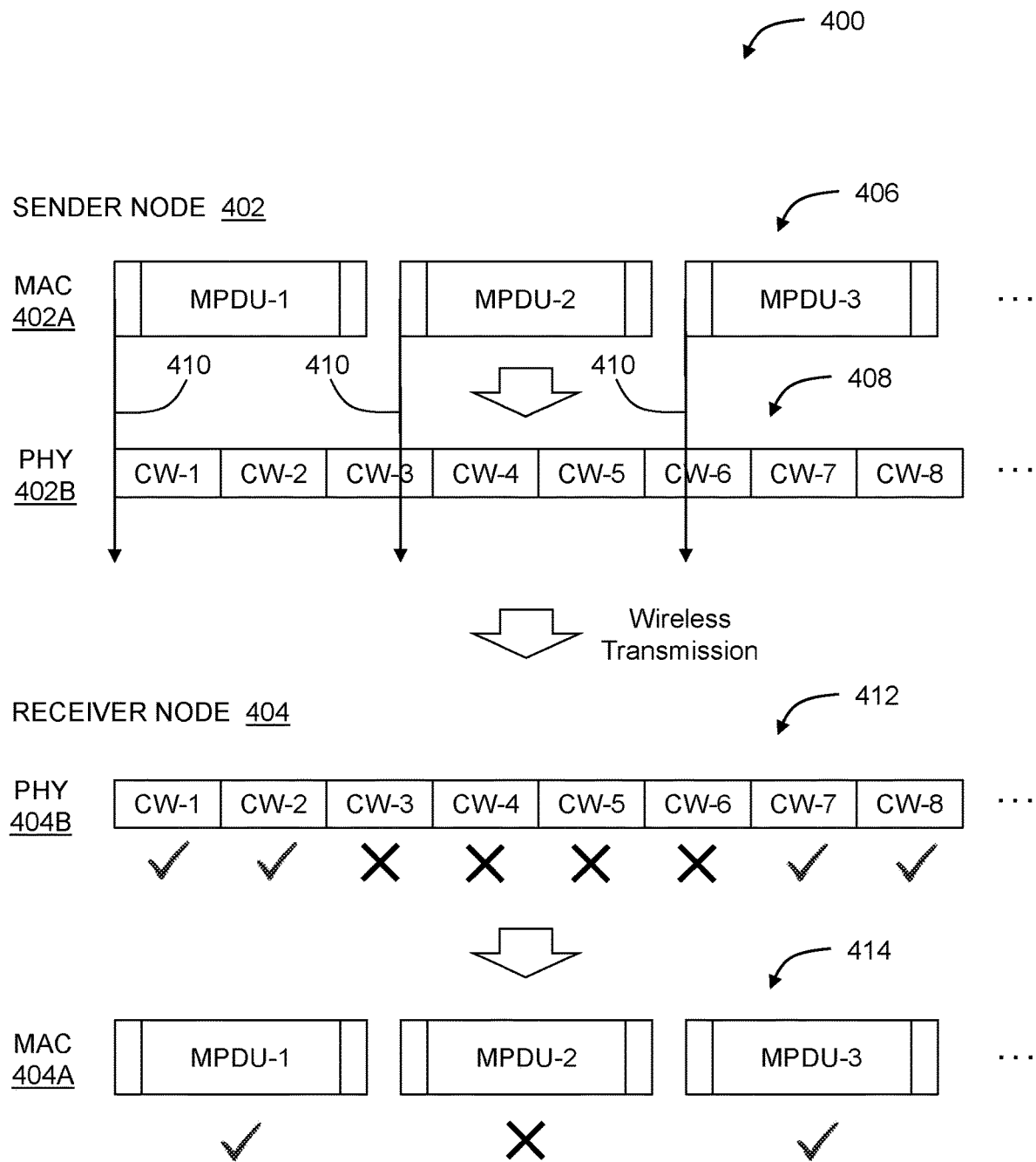
FIG. 4 illustrates an example MAC to MAC transmission process from a sender node to a receiver node.

FIG. 4 illustrates an example MAC to MAC transmission process 400 from a sender node 402 to a receiver node 404, arranged in accordance with at least one embodiment described herein. Each of the sender node 402 and the receiver node 404 includes a MAC 402A, 404A and a PHY 402B, 404B. In particular, at the sender node 402, the MAC 402A passes an A-MPDU 406 made of multiple MPDUs to the PHY 402B. The PHY 402B encodes the A-MPDU 406 as a series of codewords 408. In an example, the A-MPDU 406 includes N MPDUs that map to M codewords 408, where M>N. Each MPDU maps to multiple codewords, including complete and/or partial codewords. For example, MPDU-1 maps to codewords 1 and 2 (CW-1 and CW-2 in FIG. 4) and to a portion of codeword 3 (CW-3 in FIG. 4). Arrows 410 designate where the beginning of each MPDU (and thus the end of the preceding MPDU) maps to the codewords 408.

The codewords 408 are transmitted as a wireless packet over a wireless medium to the receiver node 404. The PHY 404B of the receiver node 404 receives the wireless packet and parses it to identify received codewords 412, which are decoded and provided to the MAC 404A as received MPDUs that make up a received A-MPDU 414. Ideally, the received codewords 412 at the receiver node 404 are identical to the codewords 408 at the sender node 402 and the received MPDUs/A-NMPDU 414 at the receiver node 404 are identical to the MPDJs/A-MPDU 406 at the sender node 402.

In practice, however, packets transferred over wireless communication channels are often prone to transmission errors due to destructive interference caused by multipath propagation, noise, and/or other issues. A retransmission may be performed by the sender node 402 when the receiver node 404 fails in decoding a packet. In an ARQ procedure, the receiver node 404 attempts to decode the retransmitted packet at the MAC level, relying on a diminishing probability of error over multiple transmissions. In some scenarios, a retransmission of a packet at a later time allows for improved channel conditions and thus a higher likelihood of successfully decoding the retransmitted packet. However, the probability of error may decay at a very slow rate for frequency selective and slow fading channels which are often present in some wireless networks.

In a HARQ procedure, the receiver node 404 combines received signals associated with an initial transmission of data with one or more retransmissions of the data, e.g., using a LLR combination, to improve the probability of successfully decoding the data. However, such a HARQ procedure requires the sender node 402 to buffer the data for retransmission and the receiver node 404 to buffer the received signals for combination. Additionally, the respective codewords of the portions of the packet to be combined must be the same between the initial transmission and retransmissions.

Examples described herein may implement HARQ at the codeword level for improved efficiency and/or feasibility compared to other implementations. Consider first HARQ at the A-MPDU level. When a whole A-MPDLU is retransmitted, the MAC of the sender node prepares the A-MPDU to be retransmitted. As described with respect to FIG. 3B, however, a retransmitted A-MPDU usually has changes compared to an original A-MPDUT, which results in a different payload at the PHY of the sender node. The PHY of the sender node has no knowledge of MPDUs and this payload is transformed into codewords for retransmission. The codewords generated for retransmission are different than the codewords of the original transmission since the A-MPDU for retransmission is different than the original A-MPDU. As such, combining of LLRs of the codewords of the original A-MPDU and the codewords of the retransmitted A-MPDU at the PHY of the receiver node is not possible since different payloads/codewords were transmitted for the retransmitted A-MPDU compared to the original A-MPDU. In addition, retransmitting an entire-A-MPDU requires more bandwidth and is therefore less efficient than retransmitting only a portion of the A-MPDU.

Next consider HARQ at the MPDU level in the example of FIG. 4 where the A-MPDU 406 includes N MPDUs mapped to M codewords, where M>N. MPDU-2 maps to a portion of codeword 3, all of codewords 4 and 5, and a portion of codeword 6. Suppose MPDU-2 is not correctly received at the MAC 404A of the receiver node 404, e.g., is not decoded correctly or is undecodable, as indicated by the cross beneath MPDU-2. A check mark beneath each of MPDU-1 and MPDU-2 indicates it was successfully received, e.g., successfully decoded. The receiver node 404 may return MPDU 13A feedback to the sender node 402 to inform the sender node 402 that MPDU-2 failed and/or that MPDU-1 and MPDU-3 were received. If the sender node 402 resends MPDU-2, it will be mapped to different codewords with different FEC padding than the portion of codeword 3, all of codewords 4 and 5, and the portion of codeword 6 as in FIG. 4. As a result, there will be a misalignment between the codewords of MPDU-2 as originally transmitted and the codewords of the retransmitted MPDU-2. In addition, the retransmitted MPDU-2 will have different bits than the original MPDU-2 due to, e.g., different retry bit, cipher text, and/or CRC bits as described with respect to FIG. 3A. The different bits of MPDU-2 for retransmission at the input of the FEC encoder result in codewords for the retransmitted MPDU-2 that are different than codewords for the original MPDU-2. As such, combining of LLRs of the codewords of the original MPDU-2 and the codewords of the retransmitted MPDU-2 at the PHY of the receiver node 404 is not possible since different payloads/codewords were transmitted for the retransmitted MPDU-2 compared to the original MPDU-2.

Examples described herein, however, implement HARQ at the codeword level for improved efficiency and/or feasibility compared to other implementations. In this and other implementations, the PHY 404B of the receiver node 404 error checks at the codeword level and the MAC 404A of the receiver node 404 errors checks at the MPDU level. The PHY 404B may error check at the codeword level using low-density parity-check (LDPC) codes included in each of the codewords 412. The MAC 404A may error check at the MPDU level using CRC codes included in each of the MPDUs of the A-MPDU 414. In this example, the MAC 404A may determine that MPDU-2 failed and MPDU-1 and MPDU-3 were received, as indicated by a cross or check mark beneath each.

The failed MPDU-2 may arise from at least one error in one or more of the partial or complete codewords to which MPDU-2 is mapped. Accordingly, the PHY 404B may specifically determine that one or more of codewords 3-6 (to which MPDU-2 maps) failed. Alternatively or additionally, the PHY 404B may receive feedback from the MAC 404A indicating that MPDU-2 failed and may mark codewords 3-6 to which MPDU-2 maps as failed, as indicated by a cross beneath each of codewords 3-6, instead of or in addition to individually error-checking each of codewords 3-6. The PHY 404B may also determine that codewords 1-2 and 7-8 were received, as indicated by a check mark beneath each.

In some implementations, the MAC 404A informs the PHY 404 of each failed MPDU and the PHY 404B may associate failed codewords to corresponding failed MPDUs. In an example, if MAC-level error checking identifies a failed MPDU and PHY-level error checking does not identify any failed codewords of the failed MPDU, the PHY may designate all of the codewords of the failed MPDU as failed codewords for retransmission. In an example, if MAC-level error checking identifies a failed MPDU and PHY-level error checking identifies only some, but not all, of the codewords of the failed MPDU as failed, the PHY may designate only the identified codewords of the failed MPDU as failed codewords for retransmission. Virtually any logic may be implemented to process discrepancies between the PHY and MAC error checking.

Figure 5A:
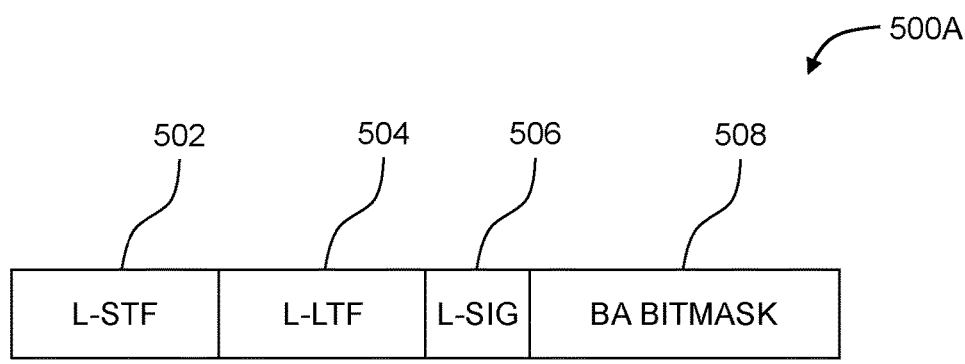
FIGS. 5A-5C illustrate example HARQ feedback packets.
Figure 5B:
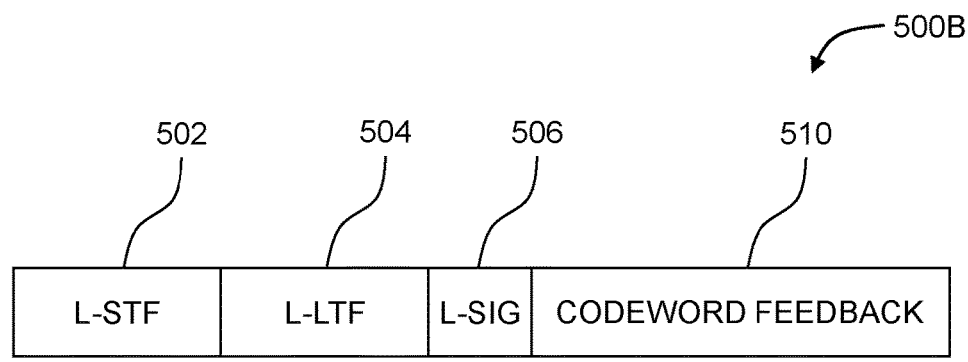
Figure 5C:
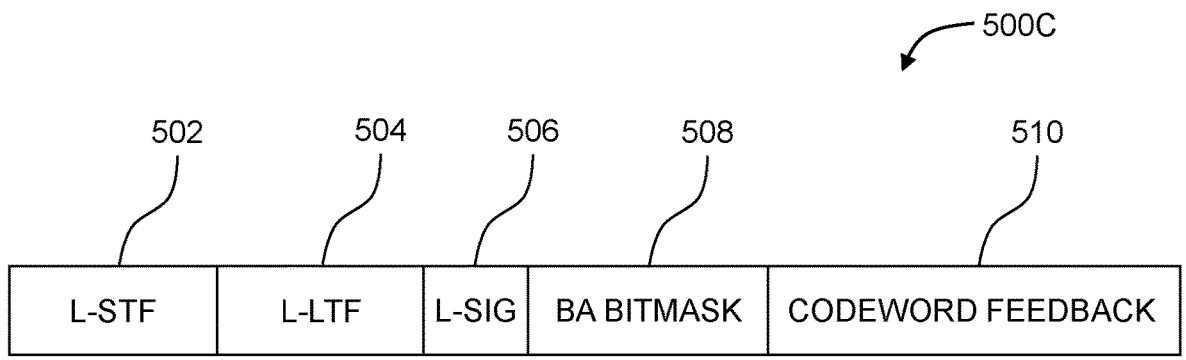

One or both of MPDU errors determined by the MAC 404A and codeword errors determined by the PHY 404B may be sent by the receiver node 404 to the sender node 402, e.g., as HARQ feedback. FIGS. 5A-5C illustrate example HARQ feedback packets 500A-500C (collectively feedback packets 500), arranged in accordance with at least one implementation described herein. Each of the feedback packets 500 may identify or indicate failed codewords and/or failed MPDUs identified by a receiver node for retransmission to the receiver node by a corresponding sender node. Each of the feedback packets 500 may include a legacy preamble with a legacy-short training field (L-STF) field 502, a legacy-long training field (L-LTF) field 504, and a legacy-signal (L-SIG) field 506.

In the example of FIG. 5A, the feedback packet 500A includes MPDU level feedback implemented as a MPDU BA bitmask 508 where a bit for each MPDU may be, e.g., set to off (or 0) to indicate an undecodable or incorrectly decoded MPDU or to on (or 1) to indicate a correctly decoded MPDU. The feedback packet 500A may additionally include a payload (not shown in FIG. 5A). The feedback packet 500A by itself is an example of conventional ARQ feedback according to some 802.11 protocols and which may be used in implementations described herein, e.g., for backwards compatibility.

In the example of FIG. 5B, the feedback packet 500B includes codeword feedback 510. The codeword feedback 510 may be implemented as a NACK that indicates and/or identifies one or more failed codewords or other suitable structure. Alternatively or additionally, the codeword feedback 510 may indicate and/or identify one or more received codewords. Codeword feedback may include information about the codeword number of one or more failed codewords that is to be retransmitted by the sender node. The PHY of the sender node may perform codeword retransmission in a dedicated manner (e.g., in a dedicated HARQ session) or by appending the codeword to the next wireless packet it sends to the receiver node. The feedback packet 500B may additionally include a payload (not shown in FIG. 5B).

In some implementations, the receiver node may send two-tier feedback that includes at least codeword level feedback 510. Two-tier feedback may be implemented by the receiver node sending the sender node both the feedback packet 500A and the feedback packet 500B. Alternatively, two-tier feedback may be implemented by combining MPDU level feedback such as the BA bitmask 508 and the codeword feedback 510 in the same feedback packet for the sender node, as illustrated in FIG. 5C.

Feedback selection can be adaptively configured between two-tier feedback and legacy feedback methods. Legacy feedback bitmasks are used without any change such that the two-tier feedback is compatible and integrable for improved backwards compatibility with minimal modification. The two-tier feedback may include the codeword feedback 510 as an additional new packet 500B.

When the MPDU level feedback 508 and codeword feedback 500B is sent in separate feedback packets 500A, 500B, the legacy preambles of the feedback packets 500A, 500B may match. For two-tier feedback with separate feedback packets 500A, 500B, the receiver node can send the sender node both a traditional MPDU level feedback packet 500A followed by a CW level feedback packet 500B, where both packets 500A, 500B have feedback information related to a single received transmission. The receiver node can transmit both feedback packets 500A, 500B back-to-back without waiting for a SIFS time between sending the feedback packets 500A, 500B. Thus, HARQ wireless nodes and non-HARQ wireless nodes can receive two-tier feedback to trigger a re-transmission.

Figure 6:
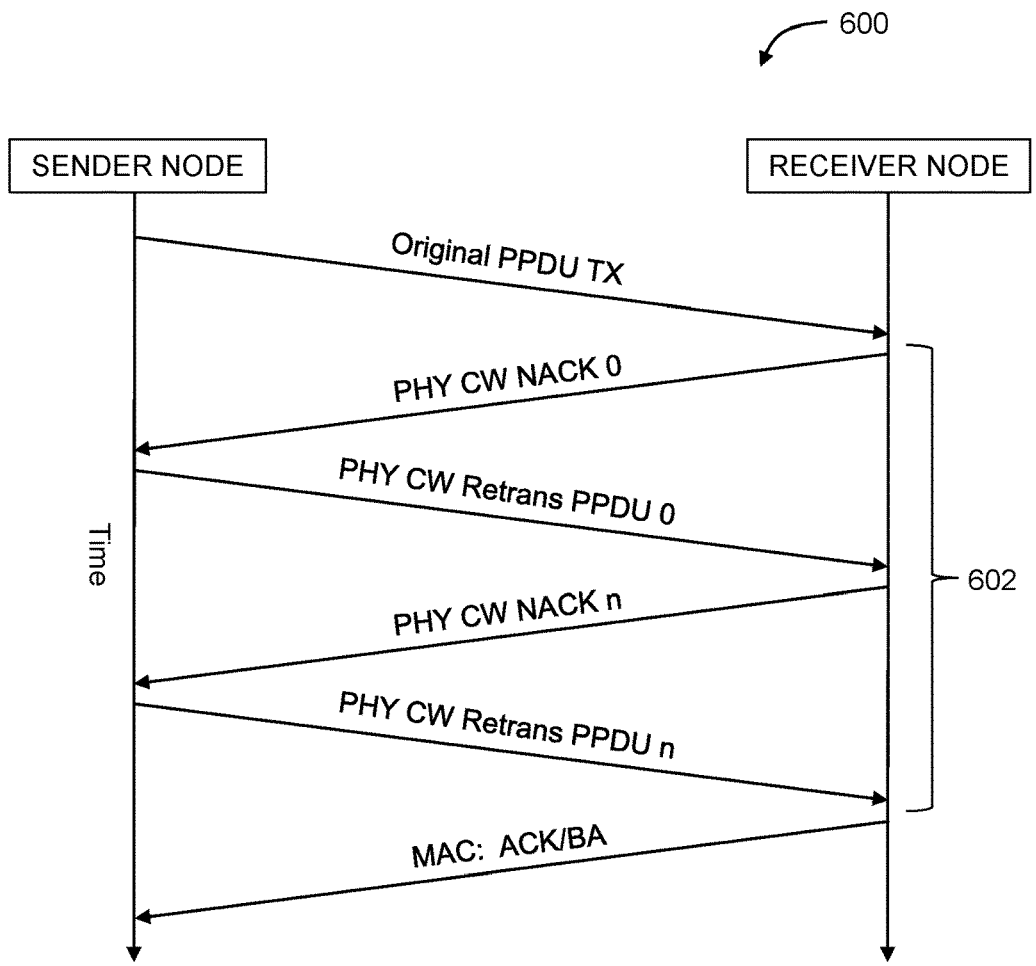
FIG. 6 illustrates an example two-tier HARQ feedback method.

FIG. 6 illustrates an example two-tier HARQ feedback method 600, arranged in accordance with at least one embodiment described herein. A sender node transmits codewords that represent an A-MPDU having multiple MPDUs to a receiver node, e.g., as an original PHY protocol data unit (PPDU). The receiver node error checks the received transmission at both the PHY and the MAC and generates and sends the sender node codeword feedback, such as a first NACK "PHY CW NACK 0" indiating one or more failed codewords. The codeword feedback initiates a dedicated HARQ session 602 between the sender node and the receiver node. In the dedicated HARQ session 602, the receiver node sends one or more codeword feedback packets indicating failed codewords (e.g., PHY CW NACK 0 and PHY CW NACK n in FIG. 6) and the sender node responds to each codeword feedback packet by sending the receiver node retransmission codewords corresponding to the failed codewords indicated in the most recent codeword feedback packet. The retransmission codewords may be sent to the receiver node in dedicated retransmission packets described as PHY CW Retrans PPDU 0 and PHY CW Retrans PPDU n in FIG. 6.

The dedicated HARQ session 602 may remain active for as long as the receiver node decides to keep it active. For example, the dedicated HARQ session 602 may terminate when the receiver node sends the sender node a conventional MPDU BA. Alternatively, the dedicated HARQ session 602 may time out or terminate in some other manner.

According to the example of FIG. 6, the receiver node initiates a dedicated HARQ session for each transmission until it is either successful or reaches a maximum HARQ retransmission threshold. This implementation may require the dedicated HARQ session to be finished before a new transmission can be started on the medium. This implementation may be simple and straightforward to implement. This implementation may be relatively inefficient as the transmission medium stays busy for longer time and no other transmission is combined with the retransmission.

Figure 7:
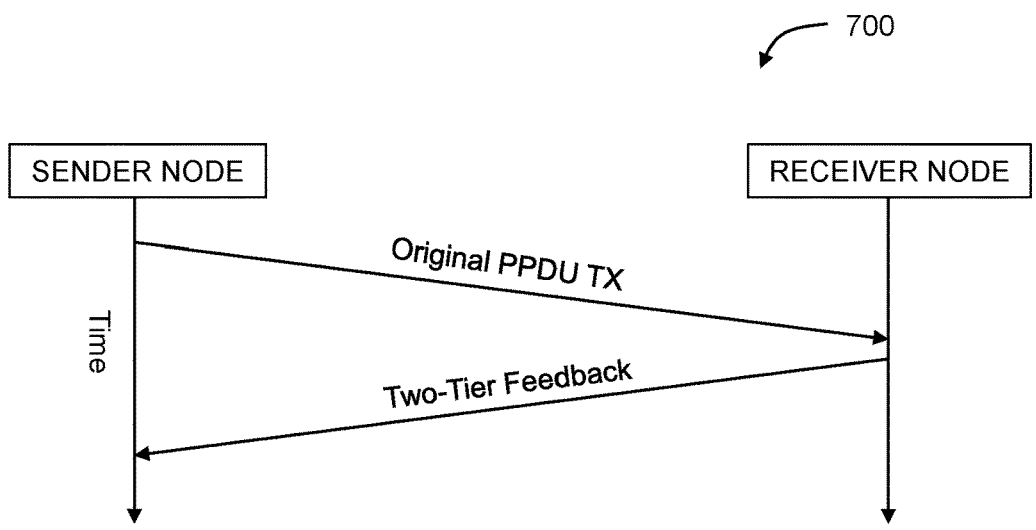
FIG. 7 illustrates another example two-tier HARQ feedback method.

FIG. 7 illustrates another example two-tier HARQ feedback method 700, arranged in accordance with at least one embodiment described herein. A sender node transmits codewords that represent an A-MPDU having multiple MPDUs to a receiver node, e.g., as an original PPDU. The receiver node error checks the received transmission at both the PHY and the MAC and generates and sends the sender node two-tier feedback that may include at least codeword feedback. The two-tier feedback may also include MPDU feedback. In response to the two-tier feedback indicating at least one failed codeword or MPDU, the sender node may send retransmission codewords combined with a new wireless packet which may be a more efficient retransmission method than the method 600 of FIG. 6. One or more compression schemes may be applied to the codeword feedback.

Figure 8A:
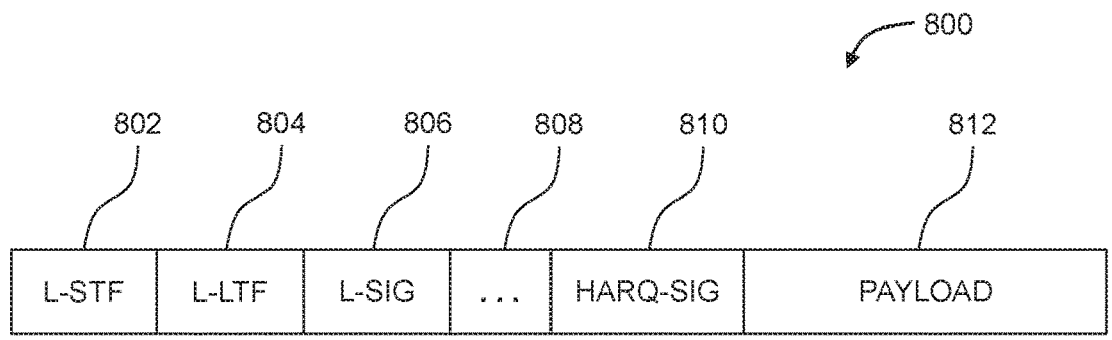
FIG. 8A illustrates an example HARQ retransmission packet.

FIG. 8A illustrates an example HARQ retransmission packet 800, arranged in accordance with at least one embodiment described herein. The HARQ retransmission packet 800 may include various PHY preamble fields, including, e.g., a L-STF field 802, a L-LTF field 804, a L-SIG field 806, one or more other fields 808, and a HARQ-signal (HARQ-SIG) field 810. The HARQ retransmission packet 800 may also include a payload 812.

Figure 8B:
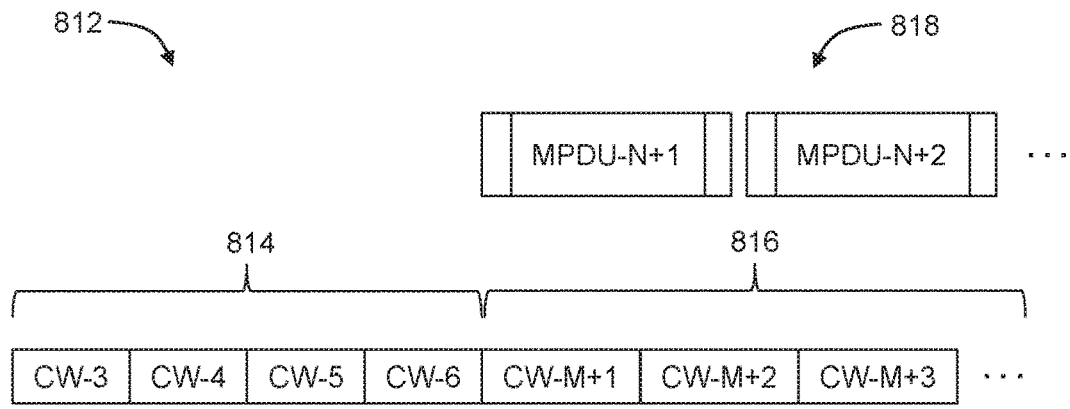
FIG. 8B illustrates an example payload of the HARQ retransmission packet of FIG. 8A.

FIG. 8B illustrates an example payload 812 of the HARQ retransmission packet 800, arranged in accordance with at least one embodiment described herein. As illustrated, the payload 812 includes retransmission codewords 814. Continuing with the previous example of FIG. 4 where MPDU-2 and/or codewords 3-6 fail and corresponding feedback is sent to the sender node, in this example the retransmission codewords 814 include retransmission codewords 3-6 which are included by the sender node 402 in the HARQ retransmission packet 800 for the receiver node 404 responsive to the two-tier feedback indicating that codewords 3-6 failed.

With continued reference to FIGS. 4 and 8A-8B, the payload 812 additionally includes new codewords 816 that represent a new A-MPDU 818 made up of MPDU-N+1, MPDU-N+2, etc. received at the PHY 402B of the sender node 402 from the MAC 402A of the sender node 402. In the example of FIG. 8B, the retransmission codewords 814 are prepended to the new codewords 816. In other implementations, the retransmission codewords 814 may be postpended to the new codewords 816 or appended at some other location in the payload 812 with respect to the new codewords 816. More generally, the retransmission codewords 814 may be concatenated to the new codewords 816, which may include postpending, prepending, or otherwise attaching or combining the retransmission codewords 814 with the new codewords 816.

The HARQ-SIG field 810 may signal to the PHY 404B of the receiver node 404 the boundary between the retransmission codewords 814 and the new payload (e.g., the new codewords 816) of the HARQ retransmission packet 800. For example, the HARQ-SIG field 810 may identify the start/end location(s) of one or both of the retransmission codewords 814 and the new codewords 816 or otherwise identify the boundary between the retransmission codewords 814 and the new codewords 816.

In another implementation, the retransmission codewords 814 may be sent in a dedicated retransmission packet without the new codewords 816. In such implementations, the HARQ-SIG field 810 may signal to the PHY 404B of the receiver node 404 that the payload 812 includes only the retransmission codewords 814.

In an example process, the sender node 402 constructs retransmission packets based on the feedback from the receiver node 404. In the example of FIGS. 4 and 8A-8B, the MAC 402A at the sender node 402 prepares the full A-MPDU 818 with its new MPDUs and sends the A-MPDU 818 to the PHY 402B of the sender node 402. The PHY 402B generates the new codewords 816 from the A-MPDU 818 received from the MAC 402A. The PHY 402B retrieves the retransmission codewords 814 from its buffer and prepends them or otherwise concatenates them to the new codewords 816. The retransmission packet 812 is then transmitted from the sender node 402 to the receiver node 404 with both the retransmission codewords 814 and the new codewords 816.

The PHY 404B of the receiver node 404 receives the HARQ retransmission packet 800, reads the HARQ-SIG field 810, and parses the retransmission codewords 814 from the new codewords 816 based on the boundary indicated by the HARQ-SIG field 810.

Figure 9:
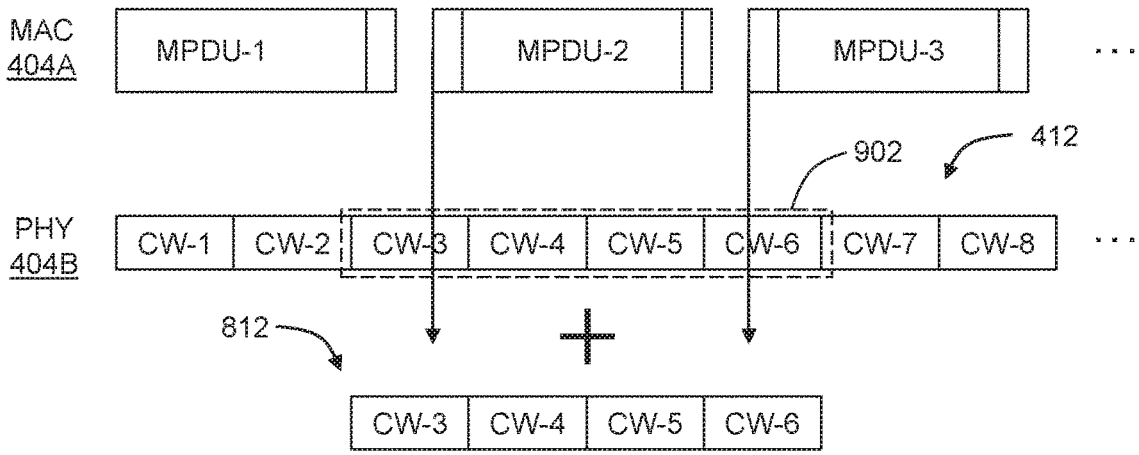
FIG. 9 illustrates an example HARQ combination method.

The retransmission codewords 814 may be parsed and if properly received may be combined at the PHY 404B of the receiver node 404 with the bit positions known to be in error in the previous payload. In this regard, FIG. 9 illustrates an example HARQ combination method 900, arranged in accordance with at least one implementation described herein. FIG. 9 continues with the example of FIGS. 4 and 8A-8B. As illustrated in FIG. 9, failed codewords 3-6, designated at 902 in FIG. 9, are the bit positions determined to be in error in the previous payload. The PHY 404B receives the retransmission codewords 812 and combines them with the failed codewords 902, e.g., according to an LLR combination.

If decoding is then successful for the previously failed codewords 902, the decoded bitstream is again presented to the MAC 404A for parsing. The MAC 404A may now determine that in addition to MDPU-1 and MPDU-3, MPDU-2 is now correctly received.

The new codewords 816 of the retransmission packet 812 may be processed as already described, e.g., by error-checking the new codewords 816 at the PHY 404B and then error-checking corresponding MPDUs at the MAC 404A of the receiver node 404 and sending corresponding two-tier feedback to the sender node 402 if any of the new codewords 816 and/or MPDUs of the A-MPDU 818 failed.

If all MPDUs are correctly received, including MPDU-1, MPDU-2, and MPDU-3 of the A-MPDU 414 as well as MPDU-N+1 and MPDU-N+2 of the A-MPDU 818, the receiver node 404 may send the sender node 402 a traditional ACK for all MPDUs. If some MPDUs and/or codewords are not decoded correctly, then the receiver node 404 can send two-tier feedback as described herein, in response to which the sender node 402 can combine corresponding retransmission codewords with new codewords as described herein.

Some implementations described herein may be spectrally efficient and may not need to setup a dedicated HARQ session. Some implementations may be independent to HARQ scheme and may support both chase combining (CC) HARQ and incremental redundancy (IR) HARQ. Some implementations pack retransmissions with new data. Due to the introduction of the HARQ-SIG field 810 (which can be pre-coded) or other PHY preamble field as described herein, some implementations can also support MU operations (OFDMA and/or MU MIMO). Some implementations described herein may implement one or more of the following changes compared to the 802.11ax protocol. At the sender node, the PHY may buffer or otherwise store codewords until confirmation of successful receipt from the receiver node and a HARQ-SIG field or other suitable PHY preamble field may be added to retransmission packets. At the receive side, the PHY may error check at the codeword level and be configured to support two-tier feedback.

Figure 10:
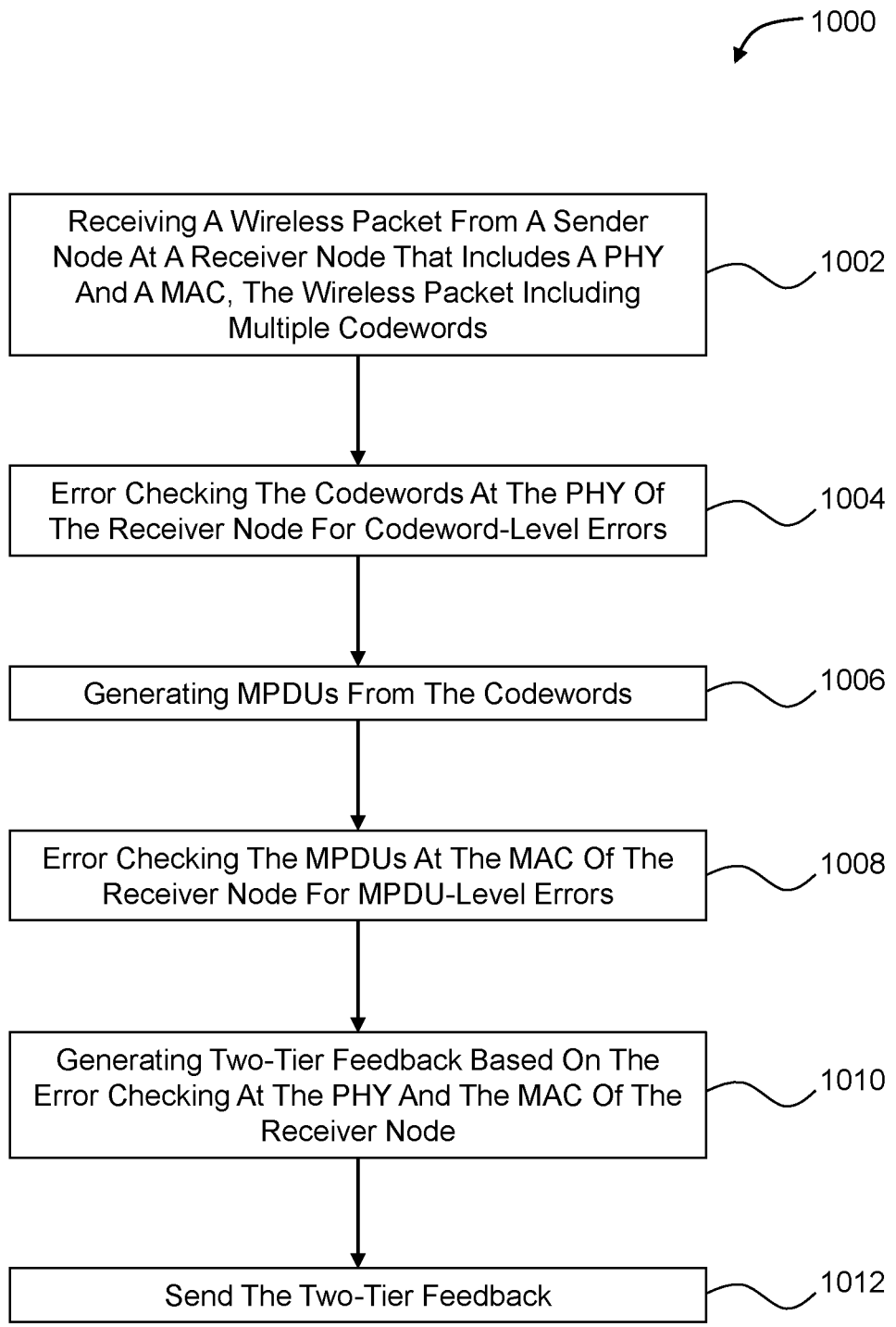
FIG. 10 is a flowchart of an example method of HARQ framing and retransmission.

FIG. 10 is a flowchart of an example method 1000 of HARQ framing and retransmission, arranged in accordance with at least one implementation described herein. The method 1000 may include or be included in other methods described herein. The method 1000 may be implemented, in whole or in part, by the receiver node 104A of FIG. 1 or other receiver nodes described herein. Alternatively or additionally, a processor device of the receiver node may execute computer-executable instructions that cause the processor device to perform or control performance of one or more of the operations or blocks of the method 1000.

At block 1002, a wireless packet may be received from a sender node at a receiver node that includes a PHY and a MAC. The wireless packet may include multiple codewords.

At block 1004, the codewords are error checked at the PHY of the receiver node for codeword-level errors. Error checking the codewords at the PHY may include checking a parity code of each of the codewords at the PHY. The parity code may include a LDPC code.

At block 1006, MPDUs are generated at the receiver node from the codewords.

At block 1008, the MPDUs are error-checked at the MAC of the receiver node for MPDU-level errors. Error checking the MPDUs at the MAC may include checking a CRC code of each of the MPDUs.

At block 1010, two-tier feedback is generated based on the error checking at the PHY and the MAC of the receiver node. Generating the two-tier feedback based on the error checking at the PHY and the MAC may include generating a NACK that identifies a failed codeword of the codewords. Generating two-tier feedback based on the error checking at the PHY and the MAC may include generating a BA bitmap that indicates, for each of the MPDUs, whether each of the MPDUs was successfully received at the receiver node.

At block 1012, the two-tier feedback is sent to the sender node.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed implementations.

In some implementations, the method 1000 may further include storing the failed codeword at the receiver node (e.g., in a PHY buffer), the failed codeword being mapped to a MPDU. The method 1000 may further include receiving a retransmission packet that includes a retransmitted codeword that corresponds to the failed codeword. The method 1000 may further include soft combining the failed codeword with the retransmitted codeword to successfully receive the codeword. The method 1000 may further include generating the MPDU from one or more other codewords and the successfully received codeword, the one or more other codewords being mapped to the MPDU and being successfully received prior to sending the two-tier feedback.

In some implementations, the codewords may include first codewords and the MPDUs may include first MPDUs. The method 1000 may further include receiving a retransmission codeword that corresponds to a failed codeword identified in the two-tier feedback. The method 1000 may further include receiving a retransmission packet that includes the retransmission codeword and second codewords that represent an A-MPDU that includes second MPDUs, the second codewords and the second MPDUs being different than the first codewords and the first MPDUs, respectively. The retransmission codeword may be prepended to the second codewords. The method 1000 may further include receiving a PHY preamble field, such as the HARQ-SIG field 810 of FIG. 8A, that identifies a boundary between the retransmission codeword and the second codewords in a payload of a retransmission packet that includes the PHY preamble field and the payload.

In some implementations, the method 1000 may further include initiating a dedicated HARQ session such as described with respect to FIG. 6. The dedicated HARQ session may be initiated by the receiver node with the sender node, e.g., to request retransmission of the failed codeword in a dedicated retransmission packet.

In some example implementations, the method 1000 may be implemented with different, fewer, or more blocks. The method 1000 may be implemented as processing logic of a circuit and/or in computer executable instructions, which can be stored on a medium, loaded onto one or more processors of one or more computing devices, and executed as a computer-implemented method.

Figure 11:
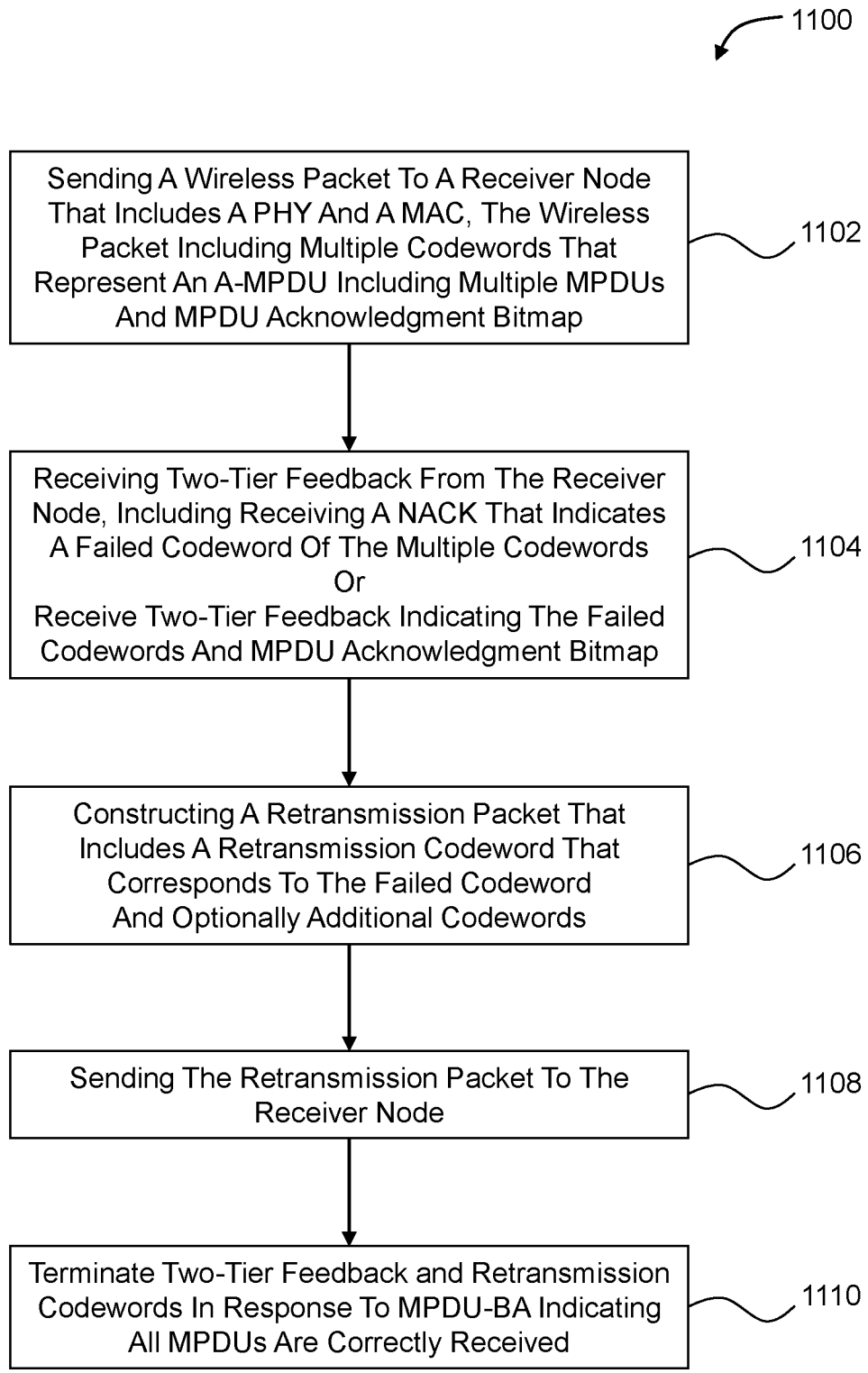
FIG. 11 is a flowchart of another example method of HARQ framing and retransmission, all arranged in accordance with at least one implementation described herein.

FIG. 11 is a flowchart of another example method 1100 of HARQ framing and retransmission, arranged in accordance with at least one implementation described herein. The method 1100 may include or be included in other methods described herein. The method 1100 may be implemented, in whole or in part, by the sender node 102 of FIG. 1 or other sender nodes described herein. Alternatively or additionally, a processor device of the sender node may execute computer-executable instructions that cause the processor device to perform or control performance of one or more of the operations or blocks of the method 1100.

At block 1102, a wireless packet is sent to a receiver node that includes a PHY and a MAC. The wireless packet includes multiple codewords that represent an A-MPDU that includes multiple MPDUs. The wireless packet may include an MPDU acknowledgment bitmap.

At block 1104, two-tier feedback is received at the sender node from the receiver node. The two-tier feedback may include a NACK that indicates a failed codeword of the codewords sent to the receiver node. Receiving two-tier feedback from the receiver node may further include receiving a BA bitmap that indicates, for each of the MPDUs, whether each of the MPDUs was successfully received at the receiver node. Alternatively or additionally, block 1104 may include receiving two-tier feedback indicating one or more failed codewords and the MPDU acknowledgment bitmap.

At block 1106, a retransmission packet is constructed that includes a retransmission codeword that corresponds to the failed codeword. Constructing the retransmission packet may include generating a PHY preamble field, such as the HARQ-SIG field 810 of FIG. 8A, for inclusion in the retransmission packet. The PHY preamble field may identify boundaries of the retransmission codeword in the retransmission packet. In an example, constructing the retransmission packet further includes combining the PHY preamble field, the retransmission codeword, and second codewords that represent a second A-MPDU to form the retransmission packet. Combining the PHY preamble field, the retransmission codeword, and the second codewords to form the retransmission packet may include concatenating the retransmission codeword to the second codewords. In some implementations, the retransmission packet may include one or more retransmission codewords that correspond to one or more failed codewords and optionally additional codewords, e.g., new codewords.

At block 1108, the retransmission packet is sent to the receiver node. Sending the retransmission packet to the receiver node may include sending the receiver node a dedicated retransmission packet that includes one or more retransmission codewords without any new codewords. The dedicated retransmission packet may be sent to the receive node in response to the receiver node initiating a dedicated HARQ session. Alternatively or additionally, the retransmission packet may include one or more retransmission codewords with new codewords.

One or more of blocks 1102, 1104, 1106, 1108 may repeat in some implementations, such as in methods that implement a dedicated HARQ session. Accordingly, the method 1100 may optionally include block 1110 in which the exchange of two-tier feedback (from the receiver node to the sender node) and retransmission codewords (from the sender node to the receiver node) for a given A-MPDU terminates in response to the receiver node sending an MPDU BA or other MPDU-level feedback to the sender node, the MPDU BA indicating that all MPDUs in the given A-MPDU are correctly received. In this and other implementations, block 1110 may terminate the dedicated HARQ session.

The method 1100 may further include buffering each of the codewords in a PHY buffer of the sender node of the wireless packet. The method 1100 may further include retrieving a codeword indicated in the two-tier feedback as the failed codeword from the PHY buffer to retransmit to the receiver node as the retransmission codeword.

In some example implementations, the method 1100 may be implemented with different, fewer, or more blocks. The method 1100 may be implemented as processing logic of a circuit and/or in computer executable instructions, which can be stored on a medium, loaded onto one or more processors of one or more computing devices, and executed as a computer-implemented method.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various embodiments, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

CSI from any of the communication links described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, and the like.

Unless specific arrangements described herein are mutually exclusive with one another, the various implementations described herein can be combined to enhance system functionality and/or to produce complementary functions. Such combinations will be readily appreciated by those skilled in the art given the totality of the foregoing description. Likewise, aspects of the implementations may be implemented in standalone arrangements where more limited and thus specific component functionality is provided within each of the interconnected—and therefore interacting—system components albeit that, in sum, they together support, realize and produce the described real-world effect(s). Indeed, it will be understood that unless features in the particular implementations are expressly identified as incompatible with one another or the surrounding context implies that they are mutually exclusive and not readily combinable in a complementary and/or supportive sense, the totality of this disclosure contemplates and envisions that specific features of those complementary implementations can be selectively combined to provide one or more comprehensive, but slightly different, technical solutions. It will, therefore, be appreciated that the above description has been given by way of example only and that modification in detail may be made within the scope of the present invention.

Implementations described herein may be implemented using computer-readable media for carrying or having computer-executable instructions or data structures stored thereon. Such computer-readable media may be any available media that may be accessed by a general-purpose or special-purpose computer. By way of example, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform or control performance of a certain function or group of functions. Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some implementations, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an implementation" or "an implementation" does not imply that such implementation or implementation is essential to the subject technology or that such implementation or implementation applies to all configurations of the subject technology. A disclosure relating to an implementation or implementation may apply to all implementations or implementations, or one or more implementations or implementations. An implementation or implementation may provide one or more examples of the disclosure. A phrase such as "an implementation" or "an implementation" may refer to one or more implementations or implementations and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

The subject technology of the present invention is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses or portions thereof may be combined in any combination, and placed into an independent clause, e.g., Clauses 1, 13, 14, and 22. The other clauses can be presented in a similar manner. The following is a non-limiting summary of some examples presented herein.

Clause 1. A method, comprising:
receiving a wireless packet from a sender node at a receiver node that includes a PHY and a MAC, the wireless packet including a plurality of codewords;
error checking the plurality of codewords at the PHY of the receiver node for codeword-level errors;
generating a plurality of MPDUs from the plurality of codewords;
error checking the plurality of MPDUs at the MAC of the receiver node for MPDU-level errors;
generating two-tier feedback based on the error checking at the PHY and the MAC of the receiver node; and
sending the two-tier feedback to the sender node.

Clause 2. The method of clause 1, wherein error checking the plurality of codewords at the PHY comprises checking a parity code of each of the plurality of codewords at the PHY.

Clause 3. The method of clause 2, wherein the parity code comprises a LDPC code.

Clause 4. The method of clause 1, wherein error checking the plurality of MPDUs at the MAC comprises checking a CRC code of each of the plurality of MPDUs.

Clause 5. The method of clause 1, wherein generating two-tier feedback based on the error checking at the PHY and the MAC comprises generating a negative acknowledgement (NACK) that identifies a failed codeword of the plurality of codewords.

Clause 6. The method of clause 1, wherein generating two-tier feedback based on the error checking at the PHY and the MAC comprises generating a BA bitmap that indicates, for each of the plurality of MPDUs, whether each of the plurality of MPDUs was successfully received at the receiver node.

Clause 7. The method of clause 5, further comprising:
storing the failed codeword at the receiver node, the failed codeword being mapped to a MPDU of the plurality of MPDUs
receiving a retransmission packet that includes a retransmitted codeword that corresponds to the failed codeword;
soft combining the failed codeword with the retransmitted codeword to successfully receive the codeword; and
generating the MPDU from one or more other codewords and the successfully received codeword, the one or more other codewords being mapped to the MPDU and being successfully received prior to sending the two-tier feedback.

Clause 8. The method of clause 1, further comprising receiving a retransmission codeword that corresponds to a failed codeword identified in the two-tier feedback.

Clause 9. The method of clause 1, further comprising receiving a plurality of retransmission codewords that correspond to failed codewords identified in the two-tier feedback in a single retransmission.

Clause 10. The method of clause 1, further comprising receiving a retransmission packet that includes one or more retransmission codewords and a second plurality of codewords that represent an A-MPDU comprising a second plurality of MPDUs, the second plurality of codewords being different than the plurality of codewords, the one or more retransmission codewords concatenated to the second plurality of codewords.

Clause 11. The method of clause 10, further comprising receiving a PHY preamble field that identifies a boundary between the one or more retransmission codewords and the second plurality of codewords in a payload of a retransmission packet that includes the PHY preamble field and the payload.

Clause 12. The method of clause 1, further comprising initiating a dedicated HARQ session with the sender node to request retransmission of the failed codeword in a dedicated retransmission packet.

Clause 13. A receiver node for wireless communication with a sender node in a wireless network, the receiver node comprising:
one or more antennas;
a plurality of components coupled to one another to form receive chains and transmit chains coupled to the one or more antennas; and
a processor coupled to the plurality of components and to the one or more antennas to perform or control performance of operations comprising:
receiving a wireless packet from the sender node at the receiver node that includes a PHY and a media access control MAC, the wireless packet including a plurality of codewords;
error checking the plurality of codewords at the PHY of the receiver node for codeword-level errors;
generating a plurality of MPDUs from the plurality of codewords;
error checking the plurality of MPDUs at the MAC of the receiver node for MPDU-level errors;
generating two-tier feedback based on the error checking at the PHY and the MAC of the receiver node; and
sending the two-tier feedback to the sender node.

Clause 14. A method, comprising:
sending a wireless packet to a receiver node that includes a PHY and a MAC, the wireless packet including a plurality of codewords that represent an A-MPDU comprising a plurality of MPDUs;
receiving two-tier feedback from the receiver node, including receiving a NACK that indicates a failed codeword of the plurality of codewords and an MPDU acknowledgment bitmap;
constructing a retransmission packet that includes a retransmission codeword that corresponds to the failed codeword; and
sending the retransmission packet to the receiver node.

Clause 15. The method of clause 14, wherein constructing the retransmission packet comprises generating a PHY preamble field for inclusion in the retransmission packet, the PHY preamble field identifying boundaries of the retransmission codeword in the retransmission packet.

Clause 16. The method of clause 15, wherein constructing the retransmission packet further comprises combining the PHY preamble field, the retransmission codeword, and a second plurality of codewords that represent a second A-MPDU to form the retransmission packet.

Clause 17. The method of clause 16, wherein combining the PHY preamble field, the retransmission codeword, and the second plurality of codewords to form the retransmission packet comprises concatenating the retransmission codeword to the second plurality of codewords.

Clause 18. The method of clause 14, wherein sending the retransmission packet to the receiver node comprises sending the receiver node a dedicated retransmission packet comprising one or more retransmission codewords without any new codewords in response to the receiver node initiating a dedicated HARQ session.

Clause 19. The method of clause 14, further comprising buffering each of the plurality of codewords in a PHY buffer of a sender node of the wireless packet and retrieving a codeword of the plurality of codewords indicated in the two-tier feedback as the failed codeword from the PHY buffer to retransmit to the receiver node as the retransmission codeword.

Clause 20. The method of clause 14, wherein receiving two-tier feedback from the receiver node further includes receiving a BA bitmap that indicates, for each of the plurality of MPDUs, whether each of the plurality of MPDUs was successfully received at the receiver node.

Clause 21. The method of clause 14, wherein constructing the retransmission packet that further includes a second plurality of codewords that represent an A-MPDU comprising a second plurality of MPDUs, the second plurality of codewords being different than the plurality of codewords, the retransmission codeword concatenated to the second plurality of codewords.

Clause 22. A sender node for wireless communication with a receiver node in a wireless network, the sender node comprising:

one or more antennas;

a plurality of components coupled to one another to form receive chains and transmit chains coupled to the one or more antennas; and a processor coupled to the plurality of components and to the one or more antennas to perform or control performance of operations comprising:

sending a wireless packet to the receiver node that includes a PHY and a MAC, the wireless packet including a plurality of codewords that represent an Aggregate MAC Protocol Data Unit (A-MPDU) comprising a plurality of MAC Protocol Data Units (MPDUs);

receiving two-tier feedback from the receiver node, including receiving a NACK that indicates a failed codeword of the plurality of codewords and MPDU acknowledgment bitmap;

constructing a retransmission packet that includes a retransmission codeword that corresponds to the failed codeword; and sending the retransmission packet to the receiver node.

Clause 23. The sender node of clause 22, wherein constructing the retransmission packet that further includes a second plurality of codewords that represent an A-MPDU comprising a second plurality of MPDUs, wherein the second plurality of codewords being different than the plurality of retransmission codewords.

Clause 24. The sender node of clause 23, wherein the retransmission codeword is concatenated to the second plurality of codewords.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Moreover, nothing disclosed herein is intended to be dedicated to the public regardless of whether such disclosure is explicitly recited in the above description.

The present disclosure is not to be limited in terms of the particular implementations described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. Also, the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed herein can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various implementations of the present disclosure have been described herein for purposes of illustration, and various modifications may be made without departing from the scope and spirit of the present disclosure. Accordingly, the various implementations disclosed herein are not intended to be limiting.

What is claimed is:

1. A method, comprising:
receiving a wireless packet from a sender node at a receiver node that includes a physical (PHY) layer frame and a media access control (MAC) layer frame, the wireless packet including a plurality of codewords;
error checking the plurality of codewords based on the PHY layer frame at the receiver node for codeword-level errors;
generating a plurality of MAC Protocol Data Units (MPDUs) from the plurality of codewords;
error checking the plurality of MPDUs based on the MAC layer frame at the receiver node for MPDU-level errors;
generating two-tier feedback based at least in part on the error checking of the plurality of codewords based on the PHY layer frame at the receiver node and the error checking of the plurality of MPDUs based on the MAC layer frame at the receiver node; and
sending the two-tier feedback to the sender node.

2. The method of claim 1, wherein error checking the plurality of codewords based on the PHY layer frame at the receiver node comprises checking a parity code of each codeword of the plurality of codewords in the PHY layer frame at the receiver node.

3. The method of claim 2, wherein the parity code comprises a low-density parity-check (LDPC) code.

4. The method of claim 1, wherein error checking the plurality of MPDUs based on the MAC layer frame at the receiver node comprises checking a cyclic redundancy check (CRC) code of each MDPU of the plurality of MPDUs.

5. The method of claim 1, wherein error checking the plurality of codewords includes identifying a failed codeword of the plurality of codewords, wherein generating the two-tier feedback comprises generating a negative acknowledgement (NACK) that identifies the failed codeword of the plurality of codewords.

6. The method of claim 5, further comprising:
storing the failed codeword at the receiver node, the failed codeword being mapped to a MPDU of the plurality of MPDUs;
receiving a retransmission packet that includes a retransmitted codeword that corresponds to the failed codeword;
soft combining the failed codeword with the retransmitted codeword to successfully receive the codeword; and
generating the MPDU from one or more other codewords and the successfully received codeword, the one or more other codewords being mapped to the MPDU, wherein the successfully received codeword is received before the two-tier feedback is sent to the sender node.

7. The method of claim 1, wherein generating the two-tier feedback comprises generating a block acknowledge (BA) bitmap that indicates, for each MPDU of the plurality of MPDUs, whether each MPDU of the plurality of MPDUs was successfully received at the receiver node.

8. The method of claim 1, further comprising receiving a retransmission codeword that corresponds to a failed codeword identified in the two-tier feedback.

9. The method of claim 1, further comprising receiving a plurality of retransmission codewords in a single retransmission that correspond to a respective plurality of failed codewords identified in the two-tier feedback.

10. The method of claim 1, further comprising receiving a retransmission packet that includes one or more retransmission codewords and a second plurality of codewords that represent an Aggregate MAC Protocol Data Unit (A-MPDU) comprising a second plurality of MPDUs, the second plurality of codewords being different than the plurality of codewords.

11. The method of claim 10, further comprising receiving a PHY preamble field that identifies a boundary between the one or more retransmission codewords and the second plurality of codewords in a payload of a retransmission packet that includes the PHY preamble field and the payload.

12. The method of claim 1, further comprising initiating a dedicated hybrid automatic repeat request (HARQ) session with the sender node to request retransmission of a failed codeword in a dedicated retransmission packet.

13. A receiver node for wireless communication with a sender node in a wireless network, the receiver node comprising:
a memory; and
a processor coupled to the memory, the processor to perform or control performance of operations comprising:
receive a wireless packet from the sender node at the receiver node that includes a physical (PHY) layer frame and a media access control (MAC) layer frame, the wireless packet including a plurality of codewords;
error check the plurality of codewords based on the PHY layer frame at the receiver node for codeword-level errors;
generate a plurality of MAC Protocol Data Units (MPDUs) from the plurality of codewords;
error check the plurality of MPDUs based on the MAC layer frame at the receiver node for MPDU-level errors;
generate two-tier feedback based at least in part on the error checking of the plurality of codewords based on the PHY layer frame and the error checking of the plurality of MPDUs based on the MAC layer frame; and
send the two-tier feedback to the sender node.

14. A method, comprising:
sending a wireless packet to a receiver node that includes a physical (PHY) layer frame and a media access control (MAC) layer frame, the wireless packet including a plurality of codewords that represent an Aggregate MAC Protocol Data Unit (A-MPDU) comprising a plurality of MAC Protocol Data Units (MPDUs);
receiving two-tier feedback from the receiver node, including receiving a negative acknowledgment (NACK) that indicates a failed codeword of the plurality of codewords and an MPDU acknowledgment bitmap;
constructing a retransmission packet that includes a retransmission codeword that corresponds to the failed codeword; and
sending the retransmission packet to the receiver node.

15. The method of claim 14, wherein constructing the retransmission packet comprises generating a PHY preamble field for inclusion in the retransmission packet, the PHY preamble field identifying boundaries of the retransmission codeword in the retransmission packet.

16. The method of claim 15, wherein constructing the retransmission packet further comprises combining the PHY preamble field, the retransmission codeword, and a second plurality of codewords that represent a second A-MPDU to form the retransmission packet.

17. The method of claim 16, wherein combining the PHY preamble field, the retransmission codeword, and the second plurality of codewords to form the retransmission packet comprises concatenating the retransmission codeword with the second plurality of codewords.

18. The method of claim 14, wherein sending the retransmission packet to the receiver node comprises, responsive to the receiver node initiating a dedicated hybrid automatic repeat request (HARQ) session, sending the receiver node a dedicated retransmission packet comprising one or more retransmission codewords without any new codewords.

19. The method of claim 14, further comprising:
buffering each codeword of the plurality of codewords in a PHY buffer of a sender node of the wireless packet; and
retrieving a codeword of the plurality of codewords indicated in the two-tier feedback as the failed codeword from the PHY buffer to retransmit to the receiver node as the retransmission codeword.

20. The method of claim 14, wherein receiving two-tier feedback from the receiver node further includes receiving a block acknowledge (BA) bitmap that indicates, for each MPDU of the plurality of MPDUs, whether each MPDU of the plurality of MPDUs was received at the receiver node.

21. The method of claim 14, wherein the retransmission packet is constructed to further include a second plurality of codewords that represent an A-MPDU comprising a second plurality of MPDUs, the second plurality of codewords being different than the plurality of codewords, the retransmission codeword concatenated with the second plurality of codewords.

22. A sender node for wireless communication with a receiver node in a wireless network, the sender node comprising:

a memory; and
a processor coupled to the memory, the processor to perform or control performance of operations comprising:
send a wireless packet to the receiver node that includes a physical (PHY) layer frame and a media access control (MAC) layer frame, the wireless packet including a plurality of codewords that represent an Aggregate MAC Protocol Data Unit (A-MPDU) comprising a plurality of MAC Protocol Data Units (MPDUs);
receive two-tier feedback from the receiver node, including receiving a negative acknowledgment (NACK) that indicates a failed codeword of the plurality of codewords and an MPDU acknowledgment bitmap;
construct a retransmission packet that includes a retransmission codeword that corresponds to the failed codeword; and
send the retransmission packet to the receiver node.

23. The sender node of claim 22, wherein the retransmission packet is constructed to further include a second plurality of codewords that represent an A-MPDU comprising a second plurality of MPDUs, the second plurality of codewords being different than the retransmission codeword.

24. The sender node of claim 23, wherein the retransmission codeword is concatenated with the second plurality of codewords.

* * * * *